United States Patent [19]

Fogelberg

[11] 3,968,704
[45] July 13, 1976

[54] POWER TRANSFER MECHANISM
[75] Inventor: Mark J. Fogelberg, Muncie, Ind.
[73] Assignee: Borg-Warner Corporation, Chicago, Ill.
[22] Filed: Nov. 25, 1974
[21] Appl. No.: 526,982

[52] U.S. Cl. .................................. 74/376; 74/363; 180/44 R; 74/665 GE
[51] Int. Cl.[2] .......................................... F16H 3/10
[58] Field of Search ............ 74/740, 336, 701, 722, 74/665 GE, 375, 376, 363; 180/44 R

[56] References Cited
UNITED STATES PATENTS

| | | |
|---|---|---|
| 1,983,955 | 12/1934 | Von Soden-Fraunhofen.... 74/375 X |
| 2,299,563 | 10/1942 | Carlson et al.......................... 74/376 |
| 2,751,029 | 6/1956 | Dixon............................... 180/44 R |
| 3,099,165 | 7/1963 | Heth et al. ......................... 74/701 X |
| 3,109,326 | 11/1963 | Holtan .............................. 74/375 X |
| 3,555,930 | 1/1971 | Boyd................................... 74/713 |

Primary Examiner—Benjamin W. Wyche
Assistant Examiner—F. D. Shoemaker
Attorney, Agent, or Firm—Julian Schachner

[57] ABSTRACT

A power transfer mechanism incorporated in a multiple path drive system includes a transfer case disposed between a source of input torque and at least one drive axle. The transfer case has a pair of parallel drive trains including a gear drive train and a chain drive train, and means for selectively engaging one of the drive trains as desired to provide power transfer. A sprocket in the chain drive train serves as one of the gears in the gear drive train.

21 Claims, 3 Drawing Figures

POWER TRANSFER MECHANISM

BACKGROUND OF THE INVENTION

1. Field of the Invention

This invention relates generally to a power transfer mechanism adapted to be incorporated in multiple path drive systems, for example four-wheel drive vehicles. More particularly, it relates to a mechanism including a torque transfer case adapted to receive torque from a prime mover and to provide a plurality of drive paths for transmitting torque to one or more drive axles.

2. Description of the prior art.

In recent years there have been many inprovements in automotive drive trains, including improvements relating to the transfer of torque from a prime mover to drive axles. However, there has been a need to provide a simplified torque transfer mechanism for establishing desirable low-speed high-torque and high-speed low-torque drive paths. At the same time there has been a need to provide such a mechanism which could be fabricated economically and which would be simple and efficient to operate and maintain.

Heretofore, torque transfer mechanisms generally have incorporated multiple gear drive trains which could be engaged selectively to transfer torque from a prime mover to drive axles. Gear drive trains were generally of heavy duty construction so that they could provide a high-torque transfer, suitable reductions often requiring the use of large gears. A gear drive providing multiple reductions similarly required the use of several large gears. In addition, the engaging mechanisms for such drive trains were elaborate and complicated.

Other torque transfer mechanisms heretofore have incorporated a chain drive which could be engaged for straight through drive, along with a gear drive train with which it could be engaged in series to provide a gear reduction to the chain drive train. Even with the reduction in the low-speed high-torque condition, it was necessary to drive through the chain drive train.

Accordingly, it is an object of this invention to meet the continuing need and desire in the art for improvements in the transmission of torque by providing an improved torque transfer mechanism including parallel low-speed high-torque and high-speed low-torque drive paths which is efficient through a wide operating range and is simple and economical to manufacture, operate and maintain. By providing parallel gear and chain drive trains, this invention allows flexible application of the improved torque transfer mechanism to vehicles with varied power requirements, and does so in a simple and economical manner.

SUMMARY OF THE INVENTION

This invention is directed in brief to an improved power transfer mechanism for use between a prime mover and at least one drive axle. The power transfer mechanism provides parallel paths for the transfer of torque, which paths may be selectively engaged to effect either low-speed high-torque or high-speed low-torque power transfer.

Parallel drive paths incorporated within the power transfer mechanism include a gear drive train for providing low-speed high-torque power transfer and a chain drive train for providing high-speed low-torque power transfer. The gear drive train provides reduction ratio torque and includes as a portion thereof one of the sprockets in the chain drive train. The chain drive train provides substantially direct drive. Suitable means are provided for effecting selective engagement of one drive train to establish a path for the desired torque transfer.

By providing parallel gear and chain drive trains wherein one of the chain drive sprockets is used as one of the gears in the gearset, one gear in a reduction gearset is eliminated. This allows for the use of a smaller transfer case, particularly where a compound reduction is necessary. It provides for simplification of assembly where a transfer case provides a reduction gearset as an option.

BRIEF DESCRIPTION OF THE DRAWINGS

The objects and advantages of this invention will become apparent to those skilled in the art upon careful consideration of the specification herein, including the drawings, wherein.

Figure 1:
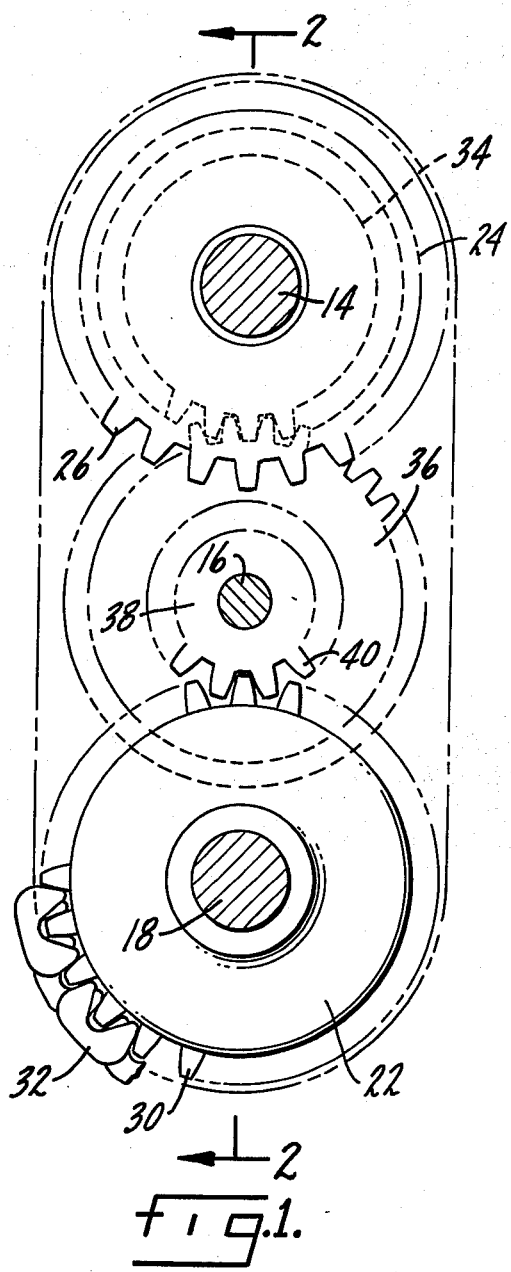
FIG. 1 is a diagrammatic view showing the relationship of the gears, sprockets and chain in the power transfer mechanism.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, there is shown generally an automotive vehicle 1 incorporating a four-wheel drive system. Vehicle 1 includes a frame 2, an engine 3, and a transmission 4 having an output shaft 5. Vehicle 1 also includes front and rear drive shafts 6 and 7 respectively, in driving engagement with front and rear drive axles 8 and 9.

A torque transfer mechanism 10 is particularly adapted for use with an automotive vehicle incorporating a four-wheel drive system where auxiliary gear reduction is desirable. The torque transfer mechanism is suitable for transmitting torque from a prime mover through one or more drive axle assemblies to drive front and rear pairs of traction wheels.

Torque transfer mechanism 10 includes a transfer case 12. An input shaft 14 is rotatably secured within case 12 and extends therefrom to receive torque, for example from transmission 4. An intermediate gear 16 is also rotatably secured within case 12.

In the preferred embodiment a pair of output shafts 18 and 20 are rotatably secured within case 12 and extend therefrom to direct torque, for example to front and rear drive shafts 6 and 7. In certain instances, relative rotation between output shafts 18 and 20 is desirable, and indeed is necessary. To effect this relative rotation, a suitable differential mechanism 22 is provided within case 12. One suitable differential mechanism may be of the type shown and described in applications of Jack F. Engle, Serial Nos. 842,182 filed July 16, 1969 and 367,669 filed June 6, 1973. The Engle applications are copending and of common assignee herewith and are incorporated herein by reference.

An input sprocket 24 is journalled on input shaft 14 for rotation relative thereto. Input sprocket 24 defines teeth 26 having an involute profile form. An output sprocket 28 is carried by differential mechanism 22 so as to provide drive for the differential mechanism and output shaft 18 and 20. Output sprocket 28 defines teeth 30 having an involute profile form.

Suitable chain 32 is in engagement with input sprocket 24 and output sprocket 28 so as to provide torque transfer therebetween. In the preferred embodiment of the invention, chain 32 is of the silent type marketed by the Morse Chain Division of Borg-Warner Corporation under the Trademark HY-VO. Details of HY-VO chain are disclosed in Riopelle et al U.S. Pat. No. 2,725,755 issued Dec. 6, 1955 and Terepin U.S. Pat. No. 3,231,699 issued Oct. 26, 1965. These patents are of common assignee herewith and are incorporated herein by reference.

In the preferred embodiment of the invention, input sprocket 24, output sprocket 28 and chain 32 comprise a chain drive train which provides approximately direct drive for the transfer of torque from input shaft 14 to output shafts 18 and 20.

A relatively small input gear 34 is journalled on input shaft 14 for rotation relative thereto. A relatively large gear 36 is carried by intermediate shaft 16 for rotation therewith and is in mesh with input gear 34. Gears 34 and 36 comprise a first reduction gearset.

A drive gear 38 is carried by intermediate shaft 16 for rotation therewith. Drive gear 38 may be of the spur gear type, and defines teeth 40 having an involute profile form. Drive gear 38 is in mesh with output sprocket 28 in the area not engaged by chain 32, and within its confines. Gear 38 and sprocket 28 define a second reduction gearset.

Figure 2:
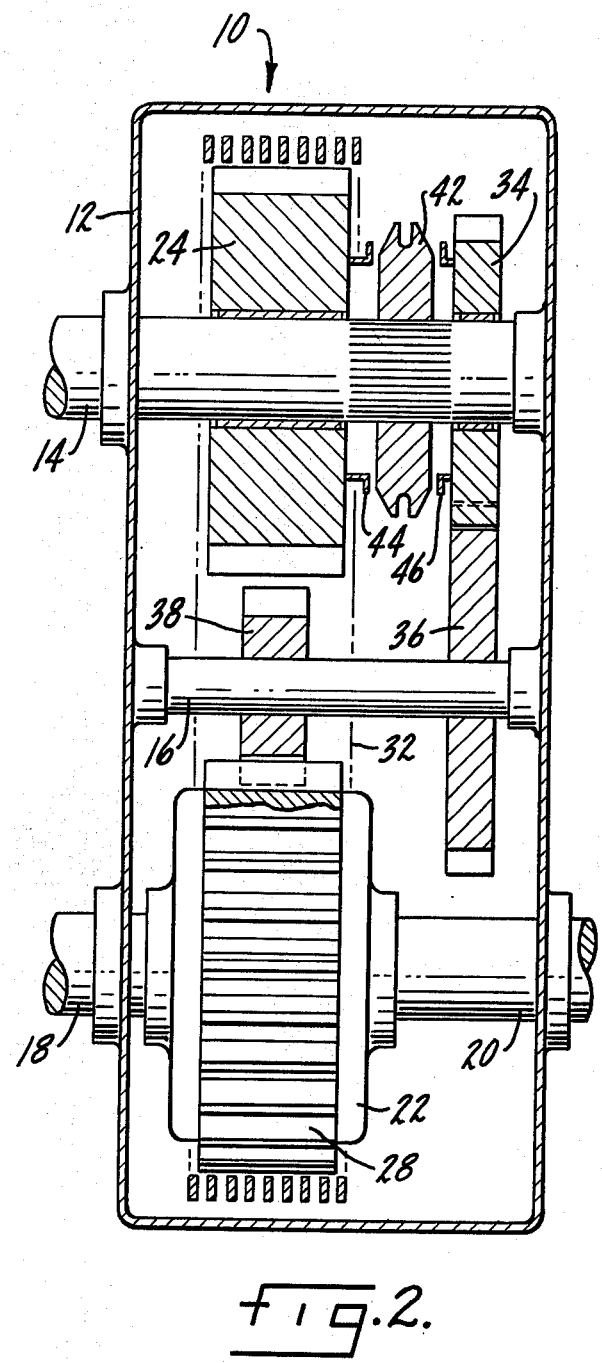
FIG. 2 is a view taken along the line 2-2 of FIG. 1 showing details of the drive trains and the selecting mechanism.
Figure 3:
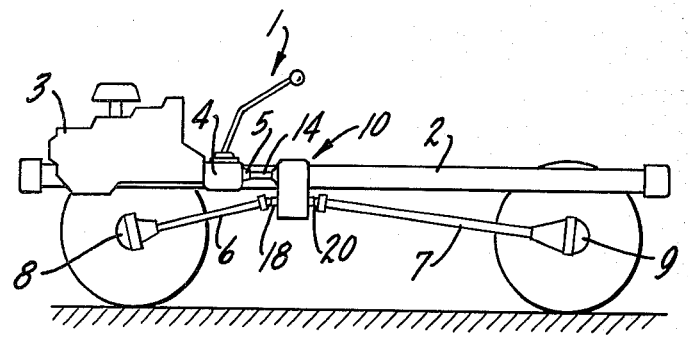
FIG. 3 is a schematic view showing one embodiment of the invention in an automotive vehicle.

Shifting means, which may be a jaw clutch 42 or the like, is splined to input shaft 14 for rotation therewith and axial sliding movement relative thereto. Complementary jaws 44 and 46 are carried by input sprocket 24 and input gear 34, respectively. Clutch 42 may be shifted from the neutral position shown in FIG. 2 leftwardly to engage jaws 44 and rightwardly to engage jaws 46.

Thus, parallel torque transfer paths may be established from input shaft 14 to output shafts 18 and 20. A first path is provided when clutch 42 is in its leftward position, thereby engaging input sprocket 24 with input shaft 14 for rotation therewith. In this position torque is transferred from input shaft 14 through the chain drive train to differential mechanism 22 and output shafts 18 and 20.

A second torque path is provided when clutch 42 is in its rightward position engaging input gear 34 with input shaft 14 for rotation therewith. In this position torque is transferred from input shaft 14 through the first and second reduction gearsets, comprising the gear drive train, to differential mechanism 22 and output shafts 18 and 20.

It should be noted that output sprocket 28 forms a part of both the chain drive train and the gear drive train, thereby eliminating one of the gears usually required in a gear drive train. This is particularly advantageous in an application where compound gear reduction is desirable; that is, where first and second reduction gearsets are used. Furthermore, the configuration of components made possible by this arrangement allows for simplification of the assembly, which is advantageous if the torque transfer mechanism is such that the gear reduction is an optional feature.

In applications where the provision of a differential mechanism is not required, output sprocket 28 may drive either one of output shafts 18 or 20 directly, and be engageable with the other by means of a suitable clutching mechanism. Alternatively, output sprocket 28 may be engageable with both output shafts 18 and 20 by means of a pair of suitable clutches. It is also contemplated that the transfer mechanism may be used in applications which require only a single output shaft.

Thus it will be seen that the transfer mechanism herein provides for torque transfer from a prime mover to one or more outputs through parallel paths, one being a chain drive train providing a high-speed low-torque range and the other being a gear drive train providing a low-speed high-torque range. This relieves the chain drive train of high-torque loads and improves the durability of the mechanism. By reducing the number of gears required for the gear drive train, cost and space advantages are obtained.

Although the torque transfer mechanism has been disclosed herein in conjunction with a particular differential mechanism, it should be understood that it may be used with other differential mechanisms, biased or unbiased, or indeed in assemblies not incorporating differential mechanisms.

It should be understood that while a preferred embodiment of the invention has been shown and described, it should be considered as illustrative and may be modified by those skilled in the art without departing from the scope thereof, which is to be limited only by the claims herein.

I claim:

1. In a power transfer mechanism for coupling power input means with power output means, the combination comprising a chain drive train engageable with said power means for effecting power transfer therebetween, said chain drive train including a pair of sprockets defining sprocket teeth and a chain engaging said teeth, a gear drive train engageable with said power means for effecting power transfer therebetween, said gear drive train including a gear meshing with said teeth of one of said sprockets, and means for selectively engaging said drive trains with said power means.

2. The invention of claim 1, said power input means including an input shaft, said power output means including at least one output shaft, and said drive trains being engageable with said shafts.

3. The invention of claim 1, said one sprocket in engagement with said output shaft, and the other of said sprockets engageable with said input shaft.

4. In a power transfer mechanism for coupling an input shaft with at least one output shaft, the combination comprising a chain drive train engageable with said shafts for effecting power transfer therebetween, said chain drive train including a pair of sprockets and a chain engaging said sprockets, a gear drive train engageable with said shafts for effecting power transfer therebetween, said gear drive train including a gear and one of said sprockets, and means for selectively engaging said drive trains with said shafts, said gear drive train including a first gear engageable with said input shaft, a second gear meshing with said first gear, and a third gear in engagement with said second gear and meshing with said one sprocket.

5. The invention of claim 4, said first and second gears effecting a first reduction ratio, and said third gear and one sprocket effecting a second reduction ratio.

6. The invention of claim 4, said third gear meshing with said one sprocket in an area not engaged by said chain.

7. The invention of claim 4, said engaging means being movable between a first position engaging said input shaft with said other sprocket and a second position engaging said input shaft with said first gear.

8. The invention of claim 7, said engaging means being movable to a neutral position disengaging said input shaft with said other sprocket and first gear.

9. The invention of claim 7, said engaging means including a jaw clutch splined to said input shaft.

10. In a four-wheel drive vehicle having a first drive element in driven relationship with a prime mover and a plurality of second drive elements each in driving relationship with a respective drive axle; the improvement comprising a housing, input drive means supported by said housing and adapted to be coupled with said first drive element for receiving power therefrom, output drive means supported by said housing and adapted to be coupled with said second drive elements for transmitting power thereto, a chain drive train engageable with said drive means for high-speed low-torque power transfer therebetween, a gear drive train engageable with said drive means for low-speed high-torque power transfer therebetween, said gear drive train including a portion of said chain drive train, and means for effecting selective engagement of said drive trains with said drive means.

11. The invention of claim 10, said output drive means including a differential in driven relationship with said drive trains and in driving relationship with said second drive elements.

12. The invention of claim 10, said chain drive train including an input sprocket in driven relationship with said input drive means, an output sprocket in driving relationship with said output drive means, and a chain engaging said sprockets for power transfer therebetween, and said gear drive train including a reduction gearset in driven relationship with said input drive means and gear means in driven relationship with said reduction gearset and in driving relationship with said output sprocket.

13. The invention of claim 12, said gear means and said output sprocket forming another reduction gearset.

14. The invention of claim 13, said gear means and said output sprocket each having an involute tooth profile.

15. A torque transfer mechanism comprising a transfer case, an input shaft rotatable in said case, output shaft means rotatable in said case, a chain drive train including a first sprocket journalled on said input shaft, a second sprocket carried by said output shaft means, and a chain coupling said sprockets, a gear drive train including a first gear journalled on said input shaft, an intermediate shaft rotatable in said case, a second gear carried by said intermediate shaft and meshing with said first gear, and a third gear carried by said intermediate shaft and meshing with said second sprocket, and means for engaging said input shaft selectively with said first sprocket and first gear.

16. The invention of claim 15, said first and second gears forming a first reduction gearset, and said third gear and second sprocket forming a second reduction gearset.

17. The invention of claim (16), 15. said output shaft means including a differential driven by said second sprocket, and a pair of output shafts driven by said differential.

18. The invention of claim 1, said gear meshing with said teeth in an area not engaged by said chain.

19. The invention of claim 1, said gear and said teeth each having an involute tooth profile.

20. The invention of claim 1, said gear drive train including a first gear engageable with said input shaft, a second gear meshing with said first gear, and a third gear in engagement with said second gear and meshing with said teeth of said one sprocket.

21. The invention of claim 20, said first and second gears effecting a first reduction ratio, and said third gear and one sprocket effecting a second reduction ratio.

* * * * *